UNITED STATES PATENT OFFICE.

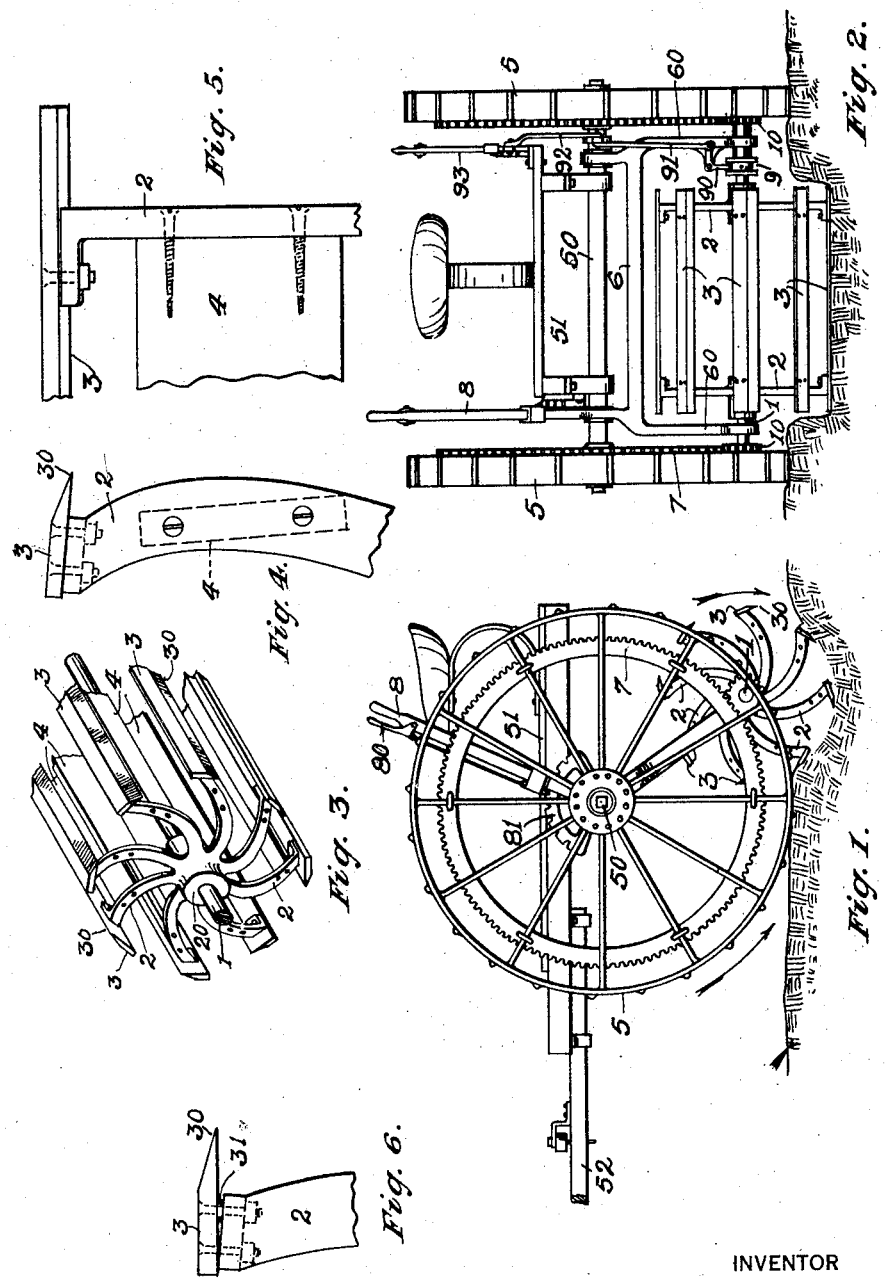

WILLIAM H. SHERROD, OF SEATTLE, WASHINGTON.

SOIL-PULVERIZER.

1,328,800.     Specification of Letters Patent.     Patented Jan. 20, 1920.

Application filed November 6, 1918. Serial No. 261,418.

*To all whom it may concern:*

Be it known that I, WILLIAM H. SHERROD, a citizen of the United States, and resident of the city of Seattle, county of King, and State of Washington, have invented certain new and useful Improvements in Soil-Pulverizers, of which the following is a specification.

My invention relates to agricultural machinery and consists of a machine which is designed to pulverize and stir the soil.

The object of my invention is to produce a machine which shall be capable of thoroughly pulverizing and cutting soil into fine particles and one which at the same time will be effective to kill the existing plant growths.

The construction of the device as I now prefer to make it, has been illustrated in the accompanying drawings and this embodiment of the invention will now be described and the features which I deem to be novel and desire to cover by Letters Patent will then be defined by the claim.

Figure 1 is a side view of my device showing the soil stirring reel, or wheel, in working position.

Fig. 2 is a view of the same device taken from the rear.

Fig. 3 shows, in perspective, the reel separated from the rest of the machine.

Figs. 4 and 5 are, respectively, end and side views of a portion of the reel comprising the outer end of one of the arms and the adjacent ends of the soil cutting and soil carrying blades.

Fig. 6 is a detail showing the manner in which the angular position of the soil cutting blades may be adjusted.

The soil cutting and stirring portion of my mechanism is separately shown, in perspective, by Fig. 3. This reel, as I call it, is mounted upon a shaft 1 and comprises a number of arms 2 which extend from central hubs 20, which in turn are secured to the shaft 1 so as to turn therewith. To the radiating arms 2 are secured two sets of blades. One set, consisting of blades 3, is secured to the extreme outer ends of the arms and in a tangential position.

The blades 3 extend lengthwise of the reel, that is, parallel with its axis, and occupy planes which are substantially tangent to the circle formed by the outer ends of the arms. One edge of these plates is brought to a sharp edge, as shown at 30. A second set of blades 4 is employed, these being placed substantially in radial planes and extending between the arms 2 which are at opposite ends of the wheel.

The entire device is mounted upon a structure which comprises carrying or traction wheels 5, an axle 50, and the flame 51, to which a tongue 52 is attached. Mounted to swing upon the axle 50 is a frame 6. This frame has arms 60 which extend outward and downward and in the ends of which is journaled the shaft 1 of the soil cutting and stirring reel. Secured to each of the wheels 5 is a gear wheel 7. Secured to the shaft 1 of the cutting reel are pinions 10 which mesh with the gears 7 so that when the device is drawn over the ground the rotation of the traction wheels 5 will cause the soil stirring reel to be rapidly revolved.

By mounting the soil stirring reel in a frame, as 6, which may be swung about an axis concentric with the axis of the traction wheels 5, this wheel may be raised out of contact with the earth or be dropped into contact therewith, while maintaining driving engagement with the traction wheels, and the depth of its cutting into the soil may be regulated.

In order to swing this frame I provide a handle 8 which carries a locking dog, manually controlled through the handle 80 to engage with the segment 81, so that the frame may be raised or lowered and securely fixed in adjusted position.

Upon one end of the shaft 1 is mounted a clutch device 9, which is adapted to engage or disengage the pinion 10 at that side of the machine, from the shaft 1. This is desirable, particularly when the machine is being turned about, and permits one of the wheels 5 to be freed from the connection with the cutting reel. This clutch 9 is operated through a bell crank lever 90, links 91, 92, and a hand lever 93, which lattter is also provided with means for locking it in adjusted positions.

The operation of my device is as follows: It is evident how a movement of the device over the ground will cause rotation of the cutting reel from the rotation of the traction wheels 5. The depth of action of the cutting reel upon the soil is controlled by its position. It may be adjusted so as to cut deeply, or so as to cut very shallow. In the latter case, it may be used as an effective means for killing plant vegetation, without cutting very deeply into the soil. It thus becomes a scarifier or hoe.

When adjusted to cut any depth in the soil, it is necessary, in order to avoid excessive draft, to provide means whereby the soil, which has been cut by the action of the blades 3, may be removed so as not to interfere with the action of the blades following. This result is secured by the action of the radially placed blades 4. These catch the soil as lifted or cut loose by the cutting blades 3 and carry it about a circle throwing it upwardly and to the rear, so that the cutting reel is working in a trough which is continuously being filled as the machine progresses.

The speed of rotation of the cutting reel, relative to the forward movement of the machine, is such that the blades 3 never cut very deep. Their cutting action may be regulated so as to make the depth of cut of any one blade very shallow. In consequence, they will act to thoroughly pulverize the soil. Also, the power demand is minimized.

This apparatus would be very effective in working fallow ground. It would be effective in killing all vegetable growth and would pulverize the surface so as to maintain an effective dust mulch, which would retain the moisture contained in the soil.

In Fig. 6 I have shown means whereby the angular position of the cutting blades 3 may be adjusted. This may be secured by the use of spacing washers or plates, 31, which are inserted between one edge of the blade 3 and the outer end of the supporting arms 2. The thickness of these washers may be made anything desired, thereby controlling the digging effect of the blades.

My device may be used for the ordinary preparation of the ground and when so employed it does the work, not only of a plow, but of a clod crusher and harrow. The slice of earth removed by each blade is so thin that there can be no clods left. Its operation being regular there is no necessity for any harrow. Its depth of cut will depend upon the power furnished and if necessary, separate power, independent of that furnished by the traction wheels may be employed.

What I claim as my invention is:

A soil stirring and cutting machine comprising a reel mounted to turn about its axis and having longitudinally extending blades placed tangentially, soil carrying blades placed radially and within the cutting blades.

Signed at Seattle, Washington, this 28th day of October, 1918.

WILLIAM H. SHERROD.